US012683723B2

(12) United States Patent
Hindy et al.

(10) Patent No.: US 12,683,723 B2
(45) Date of Patent: Jul. 14, 2026

(54) CONFIGURING A CHANNEL STATE INFORMATION REPORT FOR FULL-DUPLEX COMMUNICATION

(71) Applicant: Lenovo (Singapore) Pte. Ltd., New Tech Park (SG)

(72) Inventors: Ahmed Hindy, Aurora, IL (US); Vijay Nangia, Woodridge, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 287 days.

(21) Appl. No.: 18/554,508

(22) PCT Filed: Apr. 4, 2022

(86) PCT No.: PCT/IB2022/053121
§ 371 (c)(1),
(2) Date: Oct. 9, 2023

(87) PCT Pub. No.: WO2022/214940
PCT Pub. Date: Oct. 13, 2022

(65) Prior Publication Data
US 2024/0056237 A1 Feb. 15, 2024

Related U.S. Application Data

(60) Provisional application No. 63/172,062, filed on Apr. 7, 2021.

(51) Int. Cl.
*H04L 5/00* (2006.01)
*H04L 5/14* (2006.01)

(52) U.S. Cl.
CPC .......... *H04L 5/0005* (2013.01); *H04L 5/0051* (2013.01); *H04L 5/0057* (2013.01); *H04L 5/14* (2013.01)

(58) Field of Classification Search
CPC ... H04L 5/0005; H04L 5/0007; H04L 5/0048; H04L 5/005; H04L 5/0051; H04L 5/0053;
(Continued)

(56) References Cited

U.S. PATENT DOCUMENTS

| | | |
|---|---|---|
| 2017/0366377 A1 | 12/2017 | Papasakellariou |
| 2020/0267701 A1 | 8/2020 | Park et al. |

(Continued)

FOREIGN PATENT DOCUMENTS

| | | |
|---|---|---|
| WO | 2018182241 A1 | 10/2018 |
| WO | 2020252765 A1 | 12/2020 |
| WO | 2021223059 A1 | 11/2021 |

OTHER PUBLICATIONS

PCT/IB2022/053121, "International Search Report and the Written Opinion of the International Searching Authority, or the Declaration", International Searching Authority, Jun. 22, 2022, pp. 1-12.

(Continued)

*Primary Examiner* — Peter Chen
(74) *Attorney, Agent, or Firm* — Kunzler Needham & Hilton; Bruce R. Needham

(57) ABSTRACT

Apparatuses, methods, and systems are disclosed for configuring a channel state information report for full-duplex communication. One method includes communicating with a network device. The network device and/or the communication device operate in a full-duplex mode. The method includes receiving at least one channel state information (CSI) reference signal (CSI-RS) on at least one time and/or frequency resource. The at least one CSI-RS is configured with at least one CSI reporting setting. The method includes transmitting at least one sounding reference signals (SRS) to the network device. The at least one time and/or frequency resource are correlated with the at least one SRS transmitted to the network device. The method includes transmitting at (Continued)

least one CSI report to the network device based on the at least one CSI-RS and/or the at least one SRS.

19 Claims, 6 Drawing Sheets

(58) Field of Classification Search
CPC ... H04L 5/0055; H04L 5/0057; H04L 1/0026; H04W 24/10; H04W 72/20; H04W 52/42; H04B 7/0626; H04B 7/0632; H04B 7/0639; H04B 7/0478
See application file for complete search history.

(56) References Cited

U.S. PATENT DOCUMENTS

| | | | | |
|---|---|---|---|---|
| 2021/0385038 A1* | 12/2021 | Gao | ..................... | H04L 5/0048 |
| 2022/0329308 A1* | 10/2022 | Huang | ................. | H04B 7/0456 |
| 2023/0057169 A1* | 2/2023 | Li | ........................ | H04B 7/0626 |

OTHER PUBLICATIONS

Samsung et al., "WF on Type I and II CSI codebooks", 3GPP TSG-RAN WG1 #89 R1-1709232, May 15-19, 2017, pp. 1-24.

3GPP, "3rd Generation Partnership Project; Technical Specification Group Radio Access Network; NR; Physical channels and modulation (Release 16)", 3GPP TS 38.211 V16.5.0, Mar. 2021, pp. 1-134.

3GPP, "3rd Generation Partnership Project; Technical Specification Group Radio Access Network; NR; Multiplexing and channel coding (Release 16)", 3GPP TS 38.212 V16.5.0, Mar. 2021, pp. 1-152.

3GPP, "3rd Generation Partnership Project; Technical Specification Group Radio Access Network; NR; Physical layer procedures for control (Release 16)", 3GPP TS 38.213 V16.5.0, Mar. 2021, pp. 1-183.

3GPP, "3rd Generation Partnership Project; Technical Specification Group Radio Access Network; NR; Physical layer procedures for data (Release 16)", 3GPP TS 38.214 V16.5.0, Mar. 2021, pp. 1-171.

3GPP, "3rd Generation Partnership Project; Technical Specification Group Radio Access Network; NR; User Equipment (UE) radio access capabilities (Release 16)", 3GPP TS 38.306 V16.4.0, Mar. 2021, pp. 1-151.

3GPP, "3rd Generation Partnership Project; Technical Specification Group Radio Access Network; NG-RAN; F1 application protocol (F1AP) (Release 16)", 3GPP TS 38.473 V16.4.0, Jan. 2021, pp. 1-461.

* cited by examiner

100

104

104

102

104

102

102

200

500

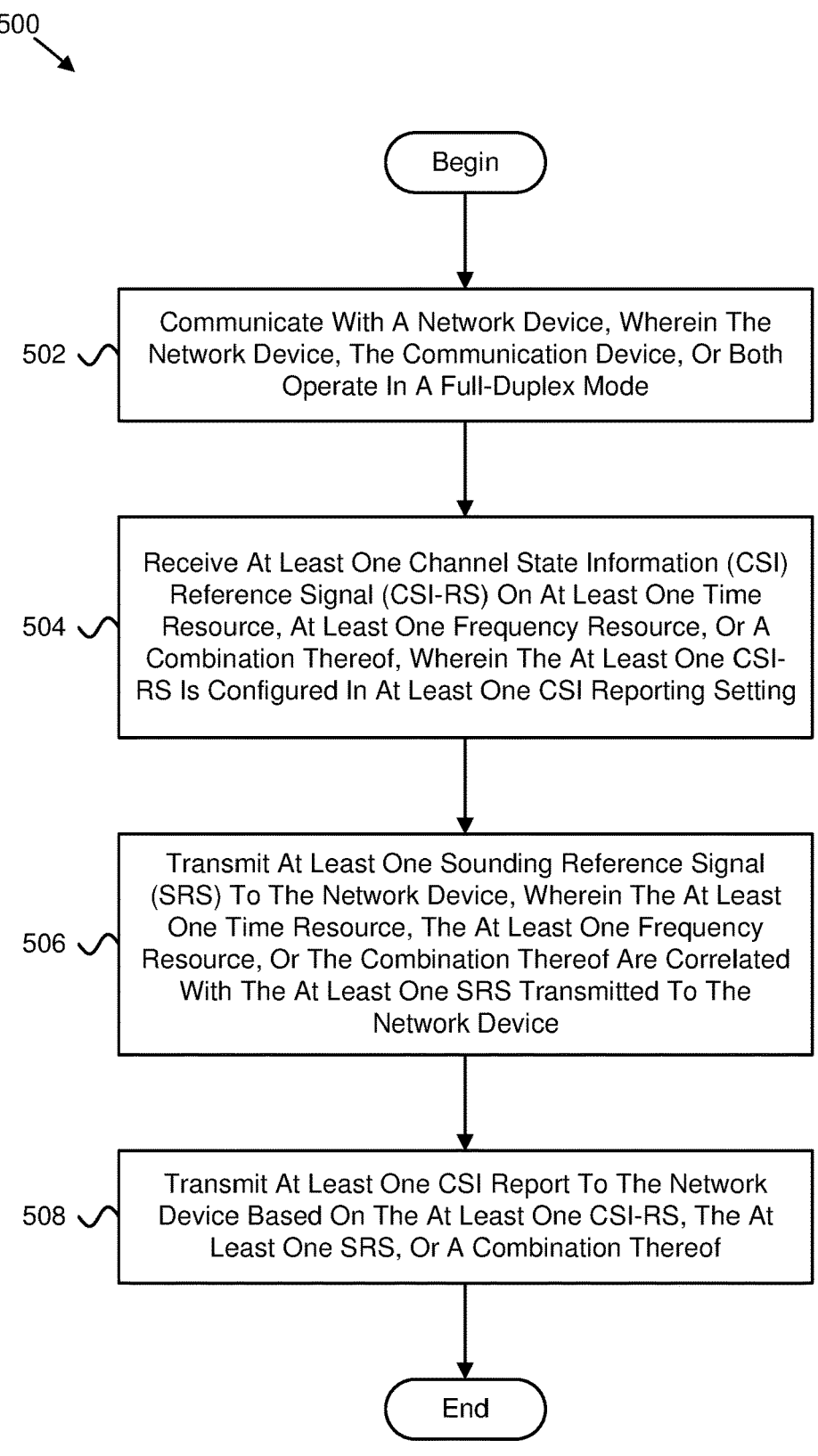

Begin

502 — Communicate With A Network Device, Wherein The Network Device, The Communication Device, Or Both Operate In A Full-Duplex Mode 504 — Receive At Least One Channel State Information (CSI) Reference Signal (CSI-RS) On At Least One Time Resource, At Least One Frequency Resource, Or A Combination Thereof, Wherein The At Least One CSI-RS Is Configured In At Least One CSI Reporting Setting 506 — Transmit At Least One Sounding Reference Signal (SRS) To The Network Device, Wherein The At Least One Time Resource, The At Least One Frequency Resource, Or The Combination Thereof Are Correlated With The At Least One SRS Transmitted To The Network Device 508 — Transmit At Least One CSI Report To The Network Device Based On The At Least One CSI-RS, The At Least One SRS, Or A Combination Thereof End

FIG. 5

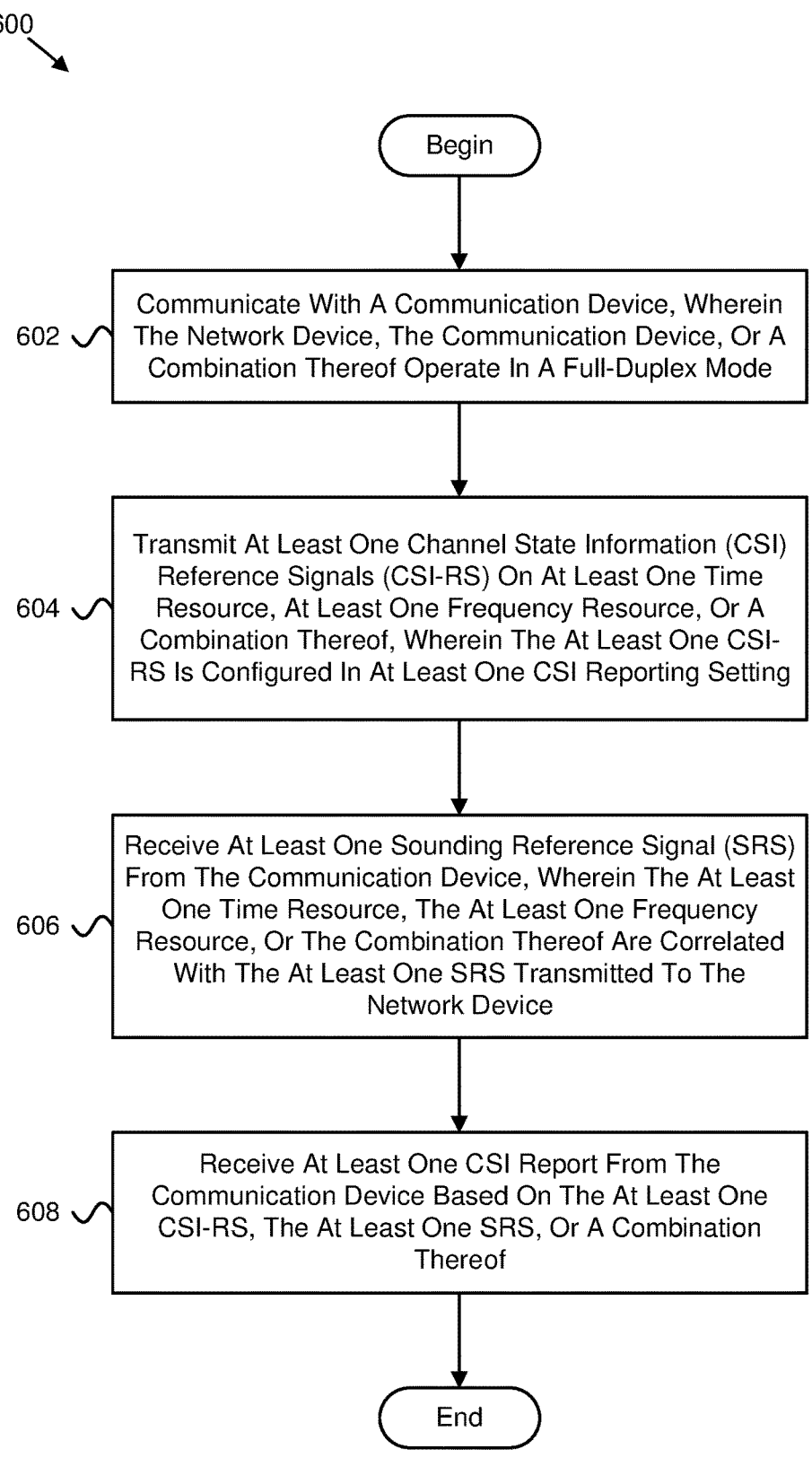

600

Begin

602 Communicate With A Communication Device, Wherein The Network Device, The Communication Device, Or A Combination Thereof Operate In A Full-Duplex Mode 604 Transmit At Least One Channel State Information (CSI) Reference Signals (CSI-RS) On At Least One Time Resource, At Least One Frequency Resource, Or A Combination Thereof, Wherein The At Least One CSI-RS Is Configured In At Least One CSI Reporting Setting 606 Receive At Least One Sounding Reference Signal (SRS) From The Communication Device, Wherein The At Least One Time Resource, The At Least One Frequency Resource, Or The Combination Thereof Are Correlated With The At Least One SRS Transmitted To The Network Device 608 Receive At Least One CSI Report From The Communication Device Based On The At Least One CSI-RS, The At Least One SRS, Or A Combination Thereof End

FIG. 6

CONFIGURING A CHANNEL STATE INFORMATION REPORT FOR FULL-DUPLEX COMMUNICATION

CROSS-REFERENCE TO RELATED APPLICATIONS

This application claims priority to U.S. Patent Application Ser. No. 63/172,062 entitled "APPARATUSES, METHODS, AND SYSTEMS FOR CSI FRAMEWORK ENHANCEMENTS UNDER FULL DUPLEX COMMUNICATION" and filed on Apr. 7, 2021 for Ahmed Hindy et al., which is incorporated herein by reference in its entirety.

FIELD

The subject matter disclosed herein relates generally to wireless communications and more particularly relates to configuring a channel state information report for full-duplex communication.

BACKGROUND

In certain wireless communications networks, channel state information reports may be made. In such networks, full-duplex communication may be used.

BRIEF SUMMARY

Methods for configuring a channel state information report for full-duplex communication are disclosed. Apparatuses and systems also perform the functions of the methods. One embodiment of a method includes communicating, at a communication device, with a network device. The network device, the communication device, or both operate in a full-duplex mode. In some embodiments, the method includes receiving at least one channel state information (CSI) reference signal (CSI-RS) on at least one time resource, at least one frequency resource, or a combination thereof. The at least one CSI-RS is configured with at least one CSI reporting setting. In certain embodiments, the method includes transmitting at least one sounding reference signals (SRS) to the network device. The at least one time resource, the at least one frequency resource, or the combination thereof are correlated with the at least one SRS transmitted to the network device. In various embodiments, the method includes transmitting at least one CSI report to the network device based on the at least one CSI-RS, the at least one SRS, or a combination thereof.

One apparatus for configuring a channel state information report for full-duplex communication includes a communication device. In some embodiments, the apparatus includes a transceiver to: communicate with a network device, wherein the network device, the communication device, or both operate in a full-duplex mode; receive at least one channel state information (CSI) reference signal (CSI-RS) on at least one time resource, at least one frequency resource, or a combination thereof, wherein the at least one CSI-RS is configured with at least one CSI reporting setting; transmit at least one sounding reference signals (SRS) to the network device, wherein the at least one time resource, the at least one frequency resource, or the combination thereof are correlated with the at least one SRS transmitted to the network device; and transmit at least one CSI report to the network device based on the at least one CSI-RS, the at least one SRS, or a combination thereof.

Another embodiment of a method for configuring a channel state information report for full-duplex communication includes communicating, at a network device, with a communication device. The network device, the communication device, or both operate in a full-duplex mode. In some embodiments, the method includes transmitting at least one channel state information (CSI) reference signals (CSI-RS) on at least one time resource, at least one frequency resource, or a combination thereof. The at least one CSI-RS is configured with at least one CSI reporting setting. In certain embodiments, the method includes receiving at least one sounding reference signals (SRS) from the communication device. The at least one time resource, the at least one frequency resource, or the combination thereof are correlated with the at least one SRS transmitted to the network device. In various embodiments, the method includes receiving at least one CSI report from the communication device based on the at least one CSI-RS, the at least one SRS, or a combination thereof.

Another apparatus for configuring a channel state information report for full-duplex communication includes a network device. In some embodiments, the apparatus includes a transceiver to: communicate with a communication device, wherein the network device, the communication device, or both operate in a full-duplex mode; transmit at least one channel state information (CSI) reference signals (CSI-RS) on at least one time resource, at least one frequency resource, or a combination thereof, wherein the at least one CSI-RS is configured with at least one CSI reporting setting; receive at least one sounding reference signals (SRS) from the communication device, wherein the at least one time resource, the at least one frequency resource, or the combination thereof are correlated with the at least one SRS transmitted to the network device; and receive at least one CSI report from the communication device based on the at least one CSI-RS, the at least one SRS, or a combination thereof.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 5 is a flow chart diagram illustrating one embodiment of a method for configuring a channel state information report for full-duplex communication; and FIG. 6 is a flow chart diagram illustrating another embodiment of a method for configuring a channel state information report for full-duplex communication.

DETAILED DESCRIPTION

Figure 1:
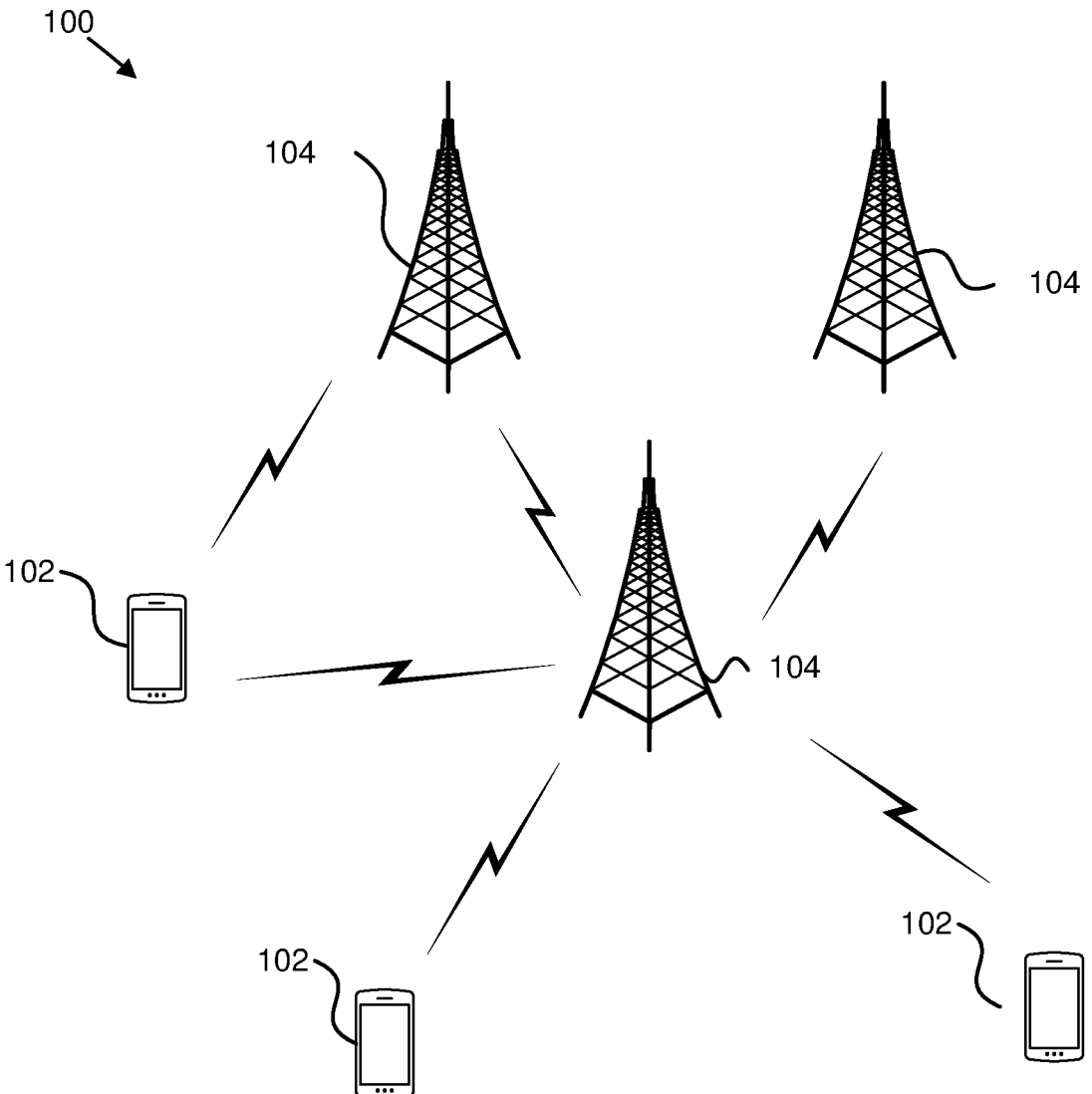
FIG. 1 is a schematic block diagram illustrating one embodiment of a wireless communication system for configuring a channel state information report for full-duplex communication.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of a storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for configuring a channel state information report for full-duplex communication. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may communicate, at a communication device, with a network device. The network device, the communication device, or both operate in a full-duplex mode. In some embodiments, the remote unit 102 may receive at least one channel state information (CSI) reference signal (CSI-RS) on at least one time resource, at least one frequency resource, or a combination thereof. The at least one CSI-RS is configured with at least one CSI reporting setting. In certain embodiments, the remote unit 102 may transmit at least one sounding reference signals (SRS) to the network device. The at least one time resource, the at least one frequency resource, or the combination thereof are correlated with the at least one SRS transmitted to the network device. In various embodiments, the remote unit 102 may transmit at least one CSI report to the network device based on the at least one CSI-RS, the at least one SRS, or a combination thereof. Accordingly, the remote unit 102 may be used for configuring a channel state information report for full-duplex communication.

In certain embodiments, a network unit 104 may communicate, at a network device, with a communication device. The network device, the communication device, or both operate in a full-duplex mode. In some embodiments, the network unit 104 may transmit at least one channel state information (CSI) reference signals (CSI-RS) on at least one time resource, at least one frequency resource, or a combination thereof. The at least one CSI-RS is configured with at least one CSI reporting setting. In certain embodiments, the network unit 104 may receive at least one sounding reference signals (SRS) from the communication device. The at least one time resource, the at least one frequency resource, or the combination thereof are correlated with the at least one SRS transmitted to the network device. In various embodiments, the network unit 104 may receive at least one CSI report from the communication device based on the at least one CSI-RS, the at least one SRS, or a combination thereof. Accordingly, the network unit 104 may be used for configuring a channel state information report for full-duplex communication.

Figure 2:
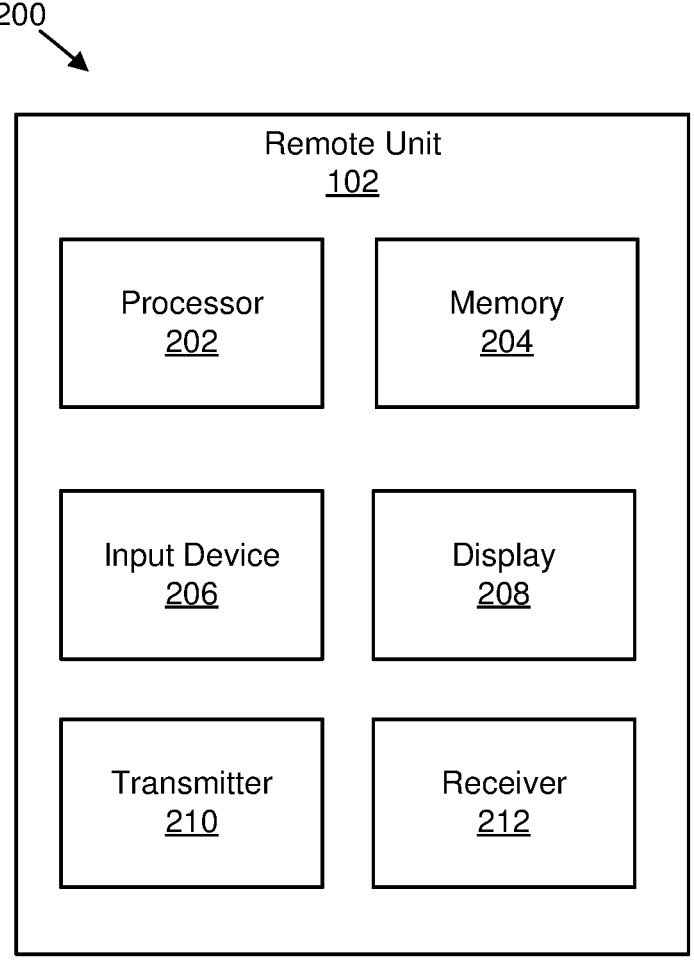
FIG. 2 is a schematic block diagram illustrating one embodiment of an apparatus that may be used for configuring a channel state information report for full-duplex communication.

FIG. 2 depicts one embodiment of an apparatus 200 that may be used for configuring a channel state information report for full-duplex communication. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

In some embodiments, the transceiver is used to: communicate with a network device, wherein the network device, the communication device, or both operate in a full-duplex mode; receive at least one channel state information (CSI) reference signal (CSI-RS) on at least one time resource, at least one frequency resource, or a combination thereof, wherein the at least one CSI-RS is configured with at least one CSI reporting setting; transmit at least one sounding reference signals (SRS) to the network device, wherein the at least one time resource, the at least one frequency resource, or the combination thereof are correlated with the at least one SRS transmitted to the network device; and transmit at least one CSI report to the network device based on the at least one CSI-RS, the at least one SRS, or a combination thereof.

Figure 3:
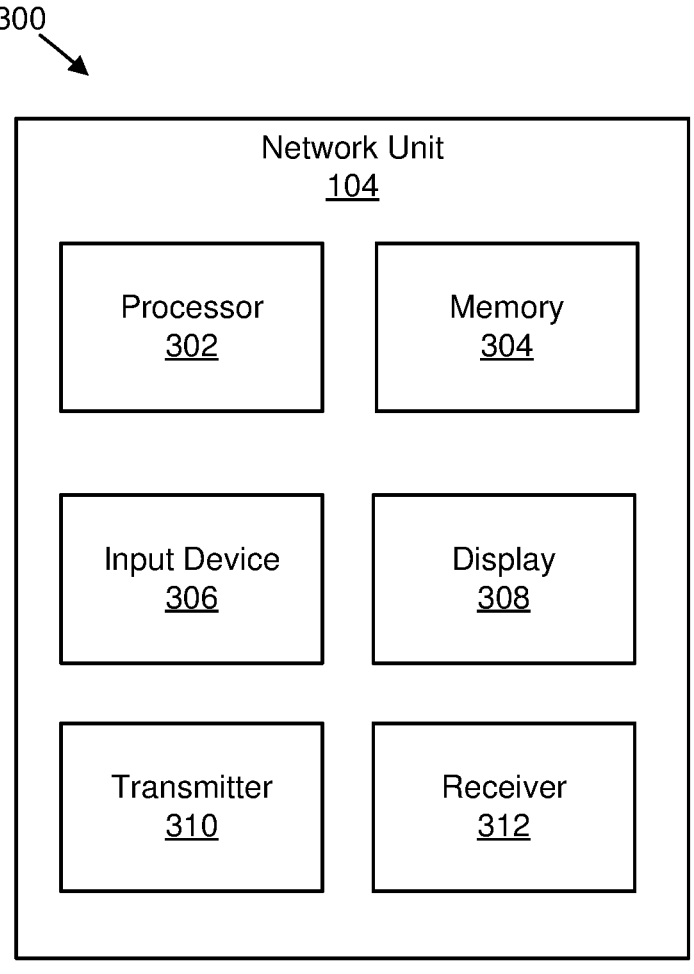
FIG. 3 is a schematic block diagram illustrating one embodiment of an apparatus that may be used for configuring a channel state information report for full-duplex communication.

FIG. 3 depicts one embodiment of an apparatus 300 that may be used for configuring a channel state information report for full-duplex communication. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the transceiver is used to: communicate with a communication device, wherein the network device, the communication device, or both operate in a full-duplex mode; transmit at least one channel state information (CSI) reference signals (CSI-RS) on at least one time resource, at least one frequency resource, or a combination thereof, wherein the at least one CSI-RS is configured with at least one CSI reporting setting; receive at least one sounding reference signals (SRS) from the communication device, wherein the at least one time resource, the at least one frequency resource, or the combination thereof are correlated with the at least one SRS transmitted to the network device; and receive at least one CSI report from the communication device based on the at least one CSI-RS, the at least one SRS, or a combination thereof.

It should be noted that one or more embodiments described herein may be combined together into a separate embodiment.

In certain embodiments, communication between a gNB and a user equipment ("UE") is made in a half-duplex mode using either frequency division duplexing ("FDD") or time division duplexing ("TDD") communication. In some embodiments, full-duplex communication ("FDC") may be used to achieve significant gain in both spectral efficiency and latency. FDC may come at the expense of increased interference levels due to self-interference resulting from simultaneous transmission and reception by the same node, as well as additional interference from nodes of the same type (e.g., gNB-to-gNB interference). In various embodiments, signaling enhancements for FDC are made as follows: 1) enhancements in a channel state information ("CSI") configuration and/or measurement and reporting for FDC; 2) downlink ("DL") codebook considerations under FDC; 3) enhancements in downlink control information ("DCI") signaling to support FDC; and/or 4) efficient CSI configuration and reporting for multi-DCI multi transmission and reception point ("TRP") transmission.

In some embodiments, embodiments for CSI measurement, feedback generation, and/or reporting may be combined to reduce overall CSI feedback overhead.

In various embodiments, "TRP" may refer to TRPs, cells, nodes, gNBs, panels, communication (e.g., signals and/or channels) associated with a control resource set ("CORESET") pool, and/or communication associated with a transmission configuration indicator ("TCI") state from a transmission configuration including at least two TCI states. In certain embodiments, "UE" may refer to mobile devices, cell phones, wearables, fixed wireless access nodes, computers, internet of things ("IoT") devices, sensors, and/or any other devices that communicates with a cellular network and receives downlink control information ("DCI") and/or higher-layer parameter configurations from a TRP.

In some embodiments, in FDD mode, a UE may be configured with at least one bandwidth part ("BWP") that can be configured for simultaneous uplink and downlink transmissions (e.g., flexible bandwidth part). Such flexible bandwidth part may be limited to one or more bandwidth parts within a licensed and/or an unlicensed spectrum.

In various embodiments, at least in TDD mode, a UE may be configured with at least one orthogonal frequency division multiplexing ("OFDM") symbol including one or more slots that can be configured for simultaneous uplink and downlink transmissions (e.g., flexible symbols). The OFDM symbols including the one or more slots may be in the downlink frame, the uplink frame, or a third (e.g., flexible) frame type that can be used for simultaneous uplink and downlink transmissions. In a first example, the flexible symbols resemble predefined flexible symbols. In a second example, the flexible symbols are a new type of symbols that support simultaneous uplink and downlink transmissions, respectively.

In certain embodiments, a UE that is capable of full-duplex communication and/or supporting concurrent transmission and reception in the same band is defined by a concurrent (e.g., simultaneous) transmission and reception UE radio access capability parameter (e.g., simultaneousRxTxFDC) which indicates whether the UE supports simultaneous transmission and reception on the same bandwidth part in one or more of TDD and FDD modes.

In some embodiments, a UE is configured by higher layers with one or more CSI-ReportConfig reporting settings for CSI reporting, one or more CSI-ResourceConfig resource settings for CSI measurement, and/or one or two lists of trigger states (e.g., given by the higher layer parameters CSI-AperiodicTriggerStateList and CSI-SemiPersistentOnPUSCH-TriggerStateList). Each trigger state in CSI-AperiodicTriggerStateList may contain a list of a subset of the associated CSI-ReportConfigs indicating resource set identifiers ("IDs") for channel and optionally for interference. Each trigger state in CSI-SemiPersistentOnPUSCH-TriggerStateList may contain one or more associated CSI-ReportConfig.

In various embodiments, a UE may be configured with one or more sounding reference signal ("SRS") resource sets as configured by a higher layer parameter SRS-ResourceSet or SRS-PosResourceSet-r16. For each SRS resource set configured by SRS-ResourceSet, a UE may be configured with SRS resources (e.g., higher layer parameter SRS-Resource), where a maximum value of K is indicated by a UE capability. The SRS resource set applicability is configured by a higher layer parameter usage in SRS-ResourceSet. If the higher layer parameter usage is set to 'beamManagement', only one SRS resource in each of multiple SRS sets may be transmitted at a given time instant, but the SRS resources in different SRS resource sets with the same time domain behavior in the same BWP may be transmitted simultaneously. For aperiodic SRS at least one state of the DCI field is used to select at least one SRS resource set out of configured SRS resource sets.

In a first embodiment of a first set of embodiments, for a full-duplex UE, the UE is expected to receive CSI reference signal ("RS") ("CSI-RS") symbols, wherein at least one of the symbols and resource elements occupying the CSI-RS symbols belong to a disjoint set from a set of at least one of the symbols and resource elements occupying the SRS symbols by which the UE is configured. In such embodiments, the UE cannot be configured to use the time and/or frequency resources corresponding to the CSI-RS symbols for transmission of any other reference signals and/or physical uplink shared channel ("PUSCH") or physical uplink control channel ("PUCCH") symbols.

In a second embodiment of the first set of embodiments, under a full-duplex transmission and reception point ("TRP") and/or gNB, a gNB configures reception of SRS transmission from at least one UE (e.g., a UE is expected to be configured with SRS transmission), wherein at least one of the symbols and resource elements occupying the SRS symbols belong to a disjoint set from the set of at least one of the symbols and resource elements occupying the CSI-RS symbols (or SSB or both) transmitted by the gNB. In such embodiments, the time and/or frequency resources corresponding to the SRS symbols are not used by the gNB for transmission of any other reference signals and/or physical downlink shared channel ("PDSCH") or physical downlink control channel ("PDCCH") symbols.

In a third embodiment of the first set of embodiments, a new reference signal ("RS") configuration such as full duplex RS ("FD-RS"), is used for both uplink ("UL") and downlink ("DL") channel sounding whenever a UE is configured with FDC. In one example, the FD-RS can be transmitted in both UL (e.g., from a UE) or DL (e.g., from a TRP), wherein the FD-RS in UL and DL may belong to different code division multiplexing ("CDM") groups.

In a fourth embodiment of the first set of embodiments, a UE is configured with at least two CSI resource settings with the first CSI resource setting (e.g., given by higher layer parameterresourcesForChannelMeasurement) being for channel measurement on a synchronization signal block ("SSB") or non-zero power ("NZP") CSI-RS, and wherein the second CSI resource setting (e.g., given by higher layer parameter csi-IM-ResourcesForinterference) is for interference measurement performed on CSI-IM. In one example, the UE may be configured and/or scheduled for UL transmission on at least a portion of the resources overlapping (e.g., time and/or frequency overlapping) with the resources corresponding to the second CSI resource setting for interference measurement. In another example, a UE may not be configured and/or scheduled for UL transmission (or the UL transmission is muted or cancelled) on any portion of the resources overlapping with the resources corresponding to the second CSI resource setting.

In a fifth embodiment of the first set of embodiments, a UE is configured with at least three CSI resource settings, with the first CSI resource setting (e.g., given by higher layer parameterresourcesForChannelMeasurement) being for channel measurement on SSB or NZP CSI-RS, and wherein the second and third resource settings (e.g., given by higher layer parameter csi-IM-ResourcesForinterference and csi-IM-ResourcesForinterference 1) are for interference measurement performed on CSI-IM. In one example, the UE may be configured and/or scheduled for UL transmission on at least a portion of the resources overlapping with the resources corresponding to the second CSI resource setting for interference measurement. The UE may not be configured and/or scheduled for UL transmission or the UL transmission is muted or cancelled on any portion of the UL resources overlapping with the resources corresponding to the third CSI resource setting.

In a second set of embodiments, there may be demodulation reference signal ("DMRS") enhancements. A UE may be configured to receive DMRS for PDSCH scheduled by PDCCH with a PDSCH-scheduling DCI format (e.g., DCI format 1_2). The UE may also be configured to transmit PUSCH scheduled by PDCCH with a PUSCH-scheduling DCI format (e.g., DCI format 0_1). A UE may also be configured to receive DMRS for PDCCH, and may be configured to transmit DMRS for PUCCH. Several embodiments are described herein for DMRS configuration under FDC, wherein either the UE, a network node, or both can support full duplex transmission and/or reception. According to a possible embodiment, one or more elements or features from one or more of the described embodiments may be combined.

In a first embodiment of the second set of embodiments, a UE is configured with both DMRS for PDSCH and DMRS for PUSCH that follow a same DMRS configuration (e.g., same time-frequency resources (e.g., REs) to be used for DMRS), wherein the DMRS for PDSCH and DMRS for PUSCH may belong to different CDM groups. In one example, a common DMRS configuration for both PDSCH and PUSCH is used.

In a second embodiment of the second set of embodiments, a UE is configured with both DMRS for PDSCH and DMRS for PUSCH that follow a same DMRS configuration, wherein the DMRS for PDSCH and DMRS for PUSCH belong to the same CDM group. In one example, a common DMRS configuration for both PDSCH and PUSCH is used.

In a third embodiment of the second set of embodiments, a UE is configured with both DMRS for PDSCH and DMRS for PUSCH, wherein the DMRS symbols for PDSCH reception and DMRS symbols for PUSCH transmission are on different symbols, different subcarriers, different resource elements ("REs"), and/or different resource blocks ("RBs"). In a first example, a pair of DMRS configurations for PDSCH and PUSCH are used for FDC. In a second example, the DMRS for PDSCH and DMRS for PUSCH follow different configurations.

In a fourth embodiment of the second set of embodiments, a UE is configured with both DMRS for PDCCH and DMRS for PUCCH that follow a same DMRS configuration, wherein the DMRS for PDCCH and DMRS for PUCCH may belong to different CDM groups. In one example, a common DMRS configuration for both PDCCH and PUCCH is used.

In a fifth embodiment of the second set of embodiments, a UE is configured with both DMRS for PDCCH and DMRS for PUCCH, wherein the DMRS symbols for PDCCH reception and DMRS symbols for PUCCH transmission are on different symbols, different subcarriers, different REs, and/or different RBs. In a first example, a pair of DMRS configurations for PDCCH and PUCCH are used for FDC. In a second example, the DMRS for PDCCH and DMRS for PUCCH follow different configurations.

In a third set of embodiments, there may be codebook configuration enhancements. In such embodiments, a UE is configured with one or more CSI reporting settings, wherein a CSI reporting setting included a codebook configuration for CSI reporting. Several embodiments are described herein. According to a possible embodiment, one or more elements or features from one or more of the described embodiments may be combined.

In a first embodiment of the third set of embodiments, the codebook configuration includes a codebook type set to a Type-I codebook. In one example, the Type-I codebook is a single-panel Type-I codebook.

In a second embodiment of the third set of embodiments, the codebook configuration includes a codebook type set to a Type-II port-selection codebook. In a first example, the Type-II port selection codebook is an enhanced Type-II port-selection codebook. In a second example, the Type-II port selection codebook is a further enhanced Type-II port-selection codebook.

In a third embodiment of the third set of embodiments, the codebook configuration includes a codebook subset restriction that is set to up to two values. In one example, a first value of the up to two values of the codebook subset restriction corresponds to non-FDC (e.g., at least one of the UE and network node involved in communication is half duplex), whereas a second value of the up to two values of the codebook subset restriction corresponds to FDC (e.g., at least one of the UE and network node involved in communication is full duplex).

In a fourth embodiment of the third set of embodiments, a codebook subset restriction corresponding to the codebook configuration is indicated in a PDCCH with a physical uplink channel-scheduling DCI format (e.g., PUSCH-scheduling DCI format 0_1 and/or 0_2).

In a fifth embodiment of the third set of embodiments, a codebook subset restriction corresponding to the codebook configuration is indicated in a PDCCH with a DCI format corresponding to (or used for) FDC (e.g., simultaneous PUSCH and/or PDSCH-scheduling DCI format 4_1).

In a sixth embodiment of the third set of embodiments, a codebook subset restriction corresponding to the codebook configuration is indicated in a PDCCH, wherein the codebook subset restriction indication is in a similar format to radio resource control ("RRC") based codebook subset restriction in codebook configuration within a CSI reporting setting.

In a seventh embodiment of the third set of embodiments, a codebook subset restriction corresponding to the codebook configuration is indicated in a PDCCH, wherein the codebook subset restriction indication is in a bitmap format, and one bit corresponds to each of the spatial beams or CSI-RS ports.

In an eighth embodiment of the third set of embodiments, a codebook subset restriction corresponding to the codebook configuration is indicated in a PDCCH, wherein the codebook subset restriction indication is group-based. In a first example, a total of B possible beams supported in a codebook are grouped into b1 distinct groups with b2 beams each, wherein B=b1b2, and the codebook subset restriction indication includes $\lceil \log_2 b_1 \rceil$ bits, such that all beams within one of the b1 beam groups are restricted (e.g., CSI feedback based on the beams corresponding to the beam-group indicated by the codebook subset restriction indication). In a second example, a total of B possible beams supported in a codebook are grouped into b1 distinct groups with b2 beams each, wherein B=b1b2, and the codebook subset restriction indication includes $\lceil \log_2 b_1 \rceil$ bits, such that all beams within one of the b1 beam groups are not restricted (e.g., CSI feedback based on beams excluding the beams corresponding to the beam-group indicated by the codebook subset restriction indication).

In a fourth set of embodiments, there may be DCI enhancements. A full-duplex UE node may be configured to transmit and receive on an uplink and a downlink channel concurrently (e.g., simultaneously), wherein the uplink channel may correspond to one or more of a PUSCH and a PUCCH, and the downlink channel may correspond to a PDSCH. In one example, the uplink and downlink channels are PUSCH and PDSCH, respectively. Several embodiments are described herein for DCI format enhancements under FDC. According to a possible embodiment, one or more elements or features from one or more of the described embodiments may be combined.

In a first embodiment of the fourth set of embodiments, one or more of time and frequency resources used for the uplink and downlink channels, as indicated by a subset of a set of DCI fields including {BWP indicator, frequency-domain resource allocation, time-domain resource allocation}, are fully overlapping.

In a second embodiment of the fourth set of embodiments, one or more of time and frequency resources used for the uplink and downlink channels, as indicated by a subset of the set of DCI fields including {BWP indicator, frequency-domain resource allocation, time-domain resource allocation}, are partially overlapping.

In a third embodiment of the fourth set of embodiments, a common DCI is used for scheduling the uplink and downlink channels. In one example, there may be a fifth DCI format class (e.g., DCI format 4_0). The common DCI may include a subset of one more DCI fields in a set of DCI fields including {BWP indicator, frequency-domain resource allocation, time-domain resource allocation}, and values corresponding to each member of the subset of the set of DCI fields are the same for the uplink and downlink channels.

In a fourth embodiment of the fourth set of embodiments, a field in a DCI that schedules a downlink channel reception indicates that a simultaneous uplink channel transmission is also scheduled. In a first example, the field in the DCI is a one-bit field that indicates whether simultaneous uplink and downlink channel transmissions are scheduled. In a second example, the field in the DCI includes an identification of a DCI that schedules the uplink channel transmission.

In a fifth embodiment of the fourth set of embodiments, a field in a DCI that schedules an uplink channel transmission indicates that a simultaneous downlink channel reception is also scheduled. In a first example, the field in the DCI is a one-bit field that indicates whether simultaneous uplink and downlink channel transmissions are scheduled. In a second example, the field in the DCI includes an identification of a DCI that schedules the downlink channel reception.

In a sixth embodiment of the fourth set of embodiments, a codebook subset restriction field is included in a DCI that schedules an uplink channel transmission.

In some embodiments, the terms antenna, panel, and antenna panel are used interchangeably. An antenna panel may be hardware that is used for transmitting and/or receiving radio signals at frequencies lower than 6 GHz (e.g., frequency range 1 ("FR1")), or higher than 6 GHz (e.g., frequency range 2 ("FR2") or millimeter wave ("mm-Wave")). In certain embodiments, an antenna panel may include an array of antenna elements. Each antenna element may be connected to hardware, such as a phase shifter, that enables a control module to apply spatial parameters for transmission and/or reception of signals. The resulting radiation pattern may be called a beam, which may or may not be unimodal and may allow the device to amplify signals that are transmitted or received from spatial directions.

In various embodiments, an antenna panel may or may not be virtualized as an antenna port. An antenna panel may be connected to a baseband processing module through a radio frequency ("RF") chain for each transmission (e.g., egress) and reception (e.g., ingress) direction. A capability of a device in terms of a number of antenna panels, their duplexing capabilities, their beamforming capabilities, and so forth, may or may not be transparent to other devices. In some embodiments, capability information may be communicated via signaling or capability information may be provided to devices without a need for signaling. If information is available to other devices the information may be used for signaling or local decision making.

In some embodiments, a UE antenna panel may be a physical or logical antenna array including a set of antenna elements or antenna ports that share a common or a significant portion of a radio frequency ("RF") chain (e.g., in-phase and/or quadrature ("I/Q") modulator, analog to digital ("A/D") converter, local oscillator, phase shift network). The UE antenna panel or UE panel may be a logical entity with physical UE antennas mapped to the logical entity. The mapping of physical UE antennas to the logical entity may be up to UE implementation. Communicating (e.g., receiving or transmitting) on at least a subset of antenna elements or antenna ports active for radiating energy (e.g., active elements) of an antenna panel may require biasing or powering on of an RF chain which results in current drain or power consumption in a UE associated with the antenna panel (e.g., including power amplifier and/or low noise amplifier ("LNA") power consumption associated with the antenna elements or antenna ports). The phrase "active for radiating energy," as used herein, is not meant to be limited to a transmit function but also encompasses a receive function. Accordingly, an antenna element that is active for radiating energy may be coupled to a transmitter to transmit radio frequency energy or to a receiver to receive radio frequency energy, either simultaneously or sequentially, or may be coupled to a transceiver in general, for performing its intended functionality. Communicating on the active elements of an antenna panel enables generation of radiation patterns or beams.

In certain embodiments, depending on a UE's own implementation, a "UE panel" may have at least one of the following functionalities as an operational role of unit of antenna group to control its transmit ("TX") beam independently, unit of antenna group to control its transmission power independently, and/or unit of antenna group to control its transmission timing independently. The "UE panel" may be transparent to a gNB. For certain conditions, a gNB or network may assume that a mapping between a UE's physical antennas to the logical entity "UE panel" may not be changed. For example, a condition may include until the next update or report from UE or include a duration of time over which the gNB assumes there will be no change to mapping. A UE may report its UE capability with respect to the "UE panel" to the gNB or network. The UE capability may include at least the number of "UE panels." In one embodiment, a UE may support UL transmission from one beam within a panel. With multiple panels, more than one beam (e.g., one beam per panel) may be used for UL transmission. In another embodiment, more than one beam per panel may be supported and/or used for UL transmission.

In some embodiments, an antenna port may be defined such that a channel over which a symbol on the antenna port is conveyed may be inferred from the channel over which another symbol on the same antenna port is conveyed.

In certain embodiments, two antenna ports are said to be quasi co-located ("QCL") if large-scale properties of a channel over which a symbol on one antenna port is conveyed may be inferred from the channel over which a symbol on another antenna port is conveyed. Large-scale properties may include one or more of delay spread, Doppler spread, Doppler shift, average gain, average delay, and/or spatial receive ("RX") parameters. Two antenna ports may be quasi co-located with respect to a subset of the large-scale properties and different subset of large-scale properties may be indicated by a QCL Type. For example, a qcl-Type may take one of the following values: 1) 'QCL-TypeA': {Doppler shift, Doppler spread, average delay, delay spread}; 2) 'QCL-TypeB': {Doppler shift, Doppler spread}; 3) 'QCL-TypeC': {Doppler shift, average delay}; and 4) 'QCL-TypeD': {Spatial Rx parameter}. Other QCL-Types may be defined based on combination of one or large-scale properties.

In various embodiments, spatial RX parameters may include one or more of: angle of arrival ("AoA"), dominant AoA, average AoA, angular spread, power angular spectrum ("PAS") of AoA, average angle of departure ("AoD"), PAS of AoD, transmit and/or receive channel correlation, transmit and/or receive beamforming, and/or spatial channel correlation.

In certain embodiments, QCL-TypeA, QCL-TypeB, and QCL-TypeC may be applicable for all carrier frequencies, but QCL-TypeD may be applicable only in higher carrier frequencies (e.g., mmWave, FR2, and beyond), where the UE may not be able to perform omni-directional transmission (e.g., the UE would need to form beams for directional transmission). For a QCL-TypeD between two reference signals A and B, the reference signal A is considered to be spatially co-located with reference signal B and the UE may assume that the reference signals A and B can be received with the same spatial filter (e.g., with the same RX beamforming weights).

In some embodiments, an "antenna port" may be a logical port that may correspond to a beam (e.g., resulting from beamforming) or may correspond to a physical antenna on a device. In certain embodiments, a physical antenna may map directly to a single antenna port in which an antenna port corresponds to an actual physical antenna. In various embodiments, a set of physical antennas, a subset of physical antennas, an antenna set, an antenna array, or an antenna sub-array may be mapped to one or more antenna ports after applying complex weights and/or a cyclic delay to the signal on each physical antenna. The physical antenna set may have antennas from a single module or panel or from multiple modules or panels. The weights may be fixed as in an antenna virtualization scheme, such as cyclic delay diversity ("CDD"). A procedure used to derive antenna ports from physical antennas may be specific to a device implementation and transparent to other devices.

In certain embodiments, a transmission configuration indicator ("TCI") state ("TCI-state") associated with a target transmission may indicate parameters for configuring a quasi-co-location relationship between the target transmission (e.g., target RS of demodulation ("DM") reference signal ("RS") ("DM-RS") ports of the target transmission during a transmission occasion) and a source reference signal (e.g., synchronization signal block ("SSB"), CSI-RS, and/or sounding reference signal ("SRS")) with respect to quasi co-location type parameters indicated in a corresponding TCI state. The TCI describes which reference signals are used as a QCL source, and what QCL properties may be derived from each reference signal. A device may receive a configuration of a plurality of transmission configuration indicator states for a serving cell for transmissions on the serving cell. In some embodiments, a TCI state includes at least one source RS to provide a reference (e.g., UE assumption) for determining QCL and/or a spatial filter.

In some embodiments, spatial relation information associated with a target transmission may indicate a spatial setting between a target transmission and a reference RS (e.g., SSB, CSI-RS, and/or SRS). For example, a UE may transmit a target transmission with the same spatial domain filter used for receiving a reference RS (e.g., DL RS such as SSB and/or CSI-RS). In another example, a UE may transmit a target transmission with the same spatial domain transmission filter used for the transmission of a RS (e.g., UL RS such as SRS). A UE may receive a configuration of multiple spatial relation information configurations for a serving cell for transmissions on a serving cell.

Figure 4:
FIG. 4 is a schematic block diagram illustrating one embodiment of a system for configuring a channel state information report for full-duplex communication.
Figure 4:
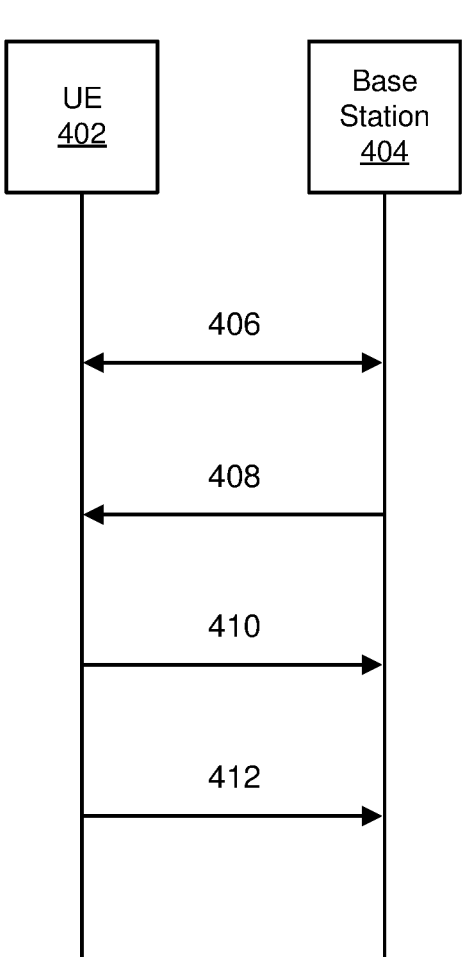

FIG. 4 is a schematic block diagram illustrating one embodiment of a system 400 for configuring a channel state information report for full-duplex communication. The system 400 includes a UE 402 and a base station 404. Each of the communications in the system 400 may include one or more messages. In a first communication 406, the UE 402 (e.g., communication device) and base station 404 (e.g., network device) communicate with one another. The network device, the communication device, or both may operate in a full-duplex mode. In a second communication 408, the UE 402 receives at least one channel state information (CSI) reference signal (CSI-RS) on at least one time resource, at least one frequency resource, or a combination thereof. The at least one CSI-RS is configured with at least one CSI reporting setting. In a third communication 410, the UE 402 transmits at least one sounding reference signals (SRS) to the base station 404. The at least one time resource, the at least one frequency resource, or the combination thereof are correlated with the at least one SRS transmitted to the base station 404. In a fourth communication 412, the UE 402 transmits at least one CSI report to the base station 404 based on the at least one CSI-RS, the at least one SRS, or a combination thereof.

FIG. 5 is a flow chart diagram illustrating one embodiment of a method 500 for configuring a channel state information report for full-duplex communication. In some embodiments, the method 500 is performed by an apparatus, such as the remote unit 102. In certain embodiments, the method 500 may be performed by a processor executing program code, for example, a microcontroller, a microprocessor, a CPU, a GPU, an auxiliary processing unit, a FPGA, or the like.

In various embodiments, the method 500 includes communicating 502, at a communication device, with a network device. The network device, the communication device, or both operate in a full-duplex mode. In some embodiments, the method 500 includes receiving 504 at least one channel state information (CSI) reference signal (CSI-RS) on at least one time resource, at least one frequency resource, or a combination thereof. The at least one CSI-RS is configured with at least one CSI reporting setting. In certain embodiments, the method 500 includes transmitting 506 at least one sounding reference signals (SRS) to the network device. The at least one time resource, the at least one frequency resource, or the combination thereof are correlated with the at least one SRS transmitted to the network device. In various embodiments, the method 500 includes transmitting 508 at least one CSI report to the network device based on the at least one CSI-RS, the at least one SRS, or a combination thereof.

In certain embodiments, the full duplex mode comprises: the network device concurrently transmitting a first signal over a physical downlink channel and receiving a second signal over a physical uplink channel over a first common set of time and frequency resources; the communication device concurrently transmitting a third signal over a physical uplink channel and receiving a fourth signal over a physical downlink channel over a second common set of time and frequency resources; or a combination thereof. In some embodiments, the full-duplex mode is associated with at least one bandwidth part (BWP) configured for at least one unlicensed band. In various embodiments, the communication device operating in the full-duplex mode is configured with a capability parameter that indicates whether the communication device supports operation in the full-duplex mode.

In one embodiment, at least one symbol of the at least one CSI-RS is received on a first at least one resource element that is disjointed from a second at least one resource element on which at least one symbol of the at least one SRS is transmitted. In certain embodiments, at least two reference signals are used for the full-duplex mode, a first reference signal of the at least two reference signals is configured to be transmitted over a physical uplink channel over a same time and frequency resources as a second reference signal of the at least two reference signals configured to be transmitted over a physical downlink channel concurrently, and symbols transmitted across the physical uplink channel and the physical downlink channel share a similar resource configuration. In some embodiments, the communication device is configured to receive a downlink (DL) demodulation reference signal (DMRS) corresponding to a physical downlink channel and to transmit an uplink (UL) DMRS corresponding to a physical uplink channel, and the DL DMRS and the UL DMRS share a similar DMRS configuration with a different code division multiplexing (CDM) group.

In various embodiments, the at least one CSI reporting setting triggers a codebook configuration that: supports a Type-I codebook; supports a Type-II port selection codebook; comprises two codebook subset restriction (CBSR) configurations, wherein one CBSR configuration of the two CBSR configurations is associated with the full-duplex mode; or some combination thereof. In one embodiment, the communication device is configured with downlink control information (DCI) that schedules an uplink transmission corresponding to a physical uplink channel, DCI that schedules a downlink reception corresponding to a physical downlink channel, or a combination thereof, wherein: at least one time resource, at least one frequency resource, or a combination thereof used for the physical uplink channel and the physical downlink channel is indicated by a BWP indicator, a frequency-domain resource allocation, a time-domain resource allocation, or some combination thereof; the at least one time resource, the at least one frequency resource, or the combination thereof used for the physical uplink channel and the physical downlink channel fully overlap one another; the at least one time resource, the at least one frequency resource, or the combination thereof used for the physical uplink channel and the physical downlink channel partially overlap one another; or some combination thereof.

In certain embodiments, a first field in the DCI that schedules the downlink reception indicates that a concurrent communication scheduled by a second field in the DCI that schedules the uplink transmission is expected. In some embodiments, a CBSR configuration associated with a codebook configuration is indicated in a DCI field that is associated with the full-duplex mode.

In various embodiments, the CBSR is indicated in a bitmap format having one bit associated with at least one beam. In one embodiment, a common DCI concurrently schedules uplink transmission and downlink reception, and the common DCI comprises a BWP indicator, a frequency-domain resource allocation, a time-domain resource allocation, or some combination thereof, and values corresponding to the common DCI are the same for the uplink transmission and downlink reception.

FIG. 6 is a flow chart diagram illustrating another embodiment of a method 600 for configuring a channel state information report for full-duplex communication. In some embodiments, the method 600 is performed by an apparatus, such as the network unit 104. In certain embodiments, the method 600 may be performed by a processor executing program code, for example, a microcontroller, a microprocessor, a CPU, a GPU, an auxiliary processing unit, a FPGA, or the like.

In various embodiments, the method 600 includes communicating 602, at a network device, with a communication device. The network device, the communication device, or both operate in a full-duplex mode. In some embodiments, the method 600 includes transmitting 604 at least one channel state information (CSI) reference signals (CSI-RS) on at least one time resource, at least one frequency resource, or a combination thereof. The at least one CSI-RS is configured with at least one CSI reporting setting. In certain embodiments, the method 600 includes receiving 606 at least one sounding reference signals (SRS) from the communication device. The at least one time resource, the at least one frequency resource, or the combination thereof are correlated with the at least one SRS transmitted to the network device. In various embodiments, the method 600 includes receiving 608 at least one CSI report from the communication device based on the at least one CSI-RS, the at least one SRS, or a combination thereof.

In certain embodiments, the full duplex mode comprises: the network device concurrently transmitting a first signal over a physical downlink channel and receiving a second signal over a physical uplink channel over a first common set of time and frequency resources; the communication device concurrently transmitting a third signal over a physical uplink channel and receiving a fourth signal over a physical downlink channel over a second common set of time and frequency resources; or a combination thereof. In some embodiments, the full-duplex mode is associated with at least one bandwidth part (BWP) configured for at least one unlicensed band. In various embodiments, the communication device operating in the full-duplex mode is configured with a capability parameter that indicates whether the communication device supports operation in the full-duplex mode.

In one embodiment, at least one symbol of the at least one CSI-RS is received on a first at least one resource element that is disjointed from a second at least one resource element on which at least one symbol of the at least one SRS is transmitted. In certain embodiments, at least two reference signals are used for the full-duplex mode, a first reference signal of the at least two reference signals is configured to be transmitted over a physical uplink channel over a same time and frequency resources as a second reference signal of the at least two reference signals configured to be transmitted over a physical downlink channel concurrently, and symbols transmitted across the physical uplink channel and the physical downlink channel share a similar resource configuration. In some embodiments, the communication device is configured to receive a downlink (DL) demodulation reference signal (DMRS) corresponding to a physical downlink channel and to transmit an uplink (UL) DMRS corresponding to a physical uplink channel, and the DL DMRS and the UL DMRS share a similar DMRS configuration with a different code division multiplexing (CDM) group.

In various embodiments, the at least one CSI reporting setting triggers a codebook configuration that: supports a Type-I codebook; supports a Type-II port selection codebook; comprises two codebook subset restriction (CBSR) configurations, wherein one CBSR configuration of the two CBSR configurations is associated with the full-duplex mode; or some combination thereof. In one embodiment, the communication device is configured with downlink control information (DCI) that schedules an uplink transmission corresponding to a physical uplink channel, DCI that schedules a downlink reception corresponding to a physical downlink channel, or a combination thereof, wherein: at least one time resource, at least one frequency resource, or a combination thereof used for the physical uplink channel and the physical downlink channel is indicated by a BWP indicator, a frequency-domain resource allocation, a time-domain resource allocation, or some combination thereof; the at least one time resource, the at least one frequency resource, or the combination thereof used for the physical uplink channel and the physical downlink channel fully overlap one another; the at least one time resource, the at least one frequency resource, or the combination thereof used for the physical uplink channel and the physical downlink channel partially overlap one another; or some combination thereof.

In certain embodiments, a first field in the DCI that schedules the downlink reception indicates that a concurrent communication scheduled by a second field in the DCI that schedules the uplink transmission is expected. In some embodiments, a CBSR configuration associated with a codebook configuration is indicated in a DCI field that is associated with the full-duplex mode.

In various embodiments, the CBSR is indicated in a bitmap format having one bit associated with at least one beam. In one embodiment, a common DCI concurrently schedules uplink transmission and downlink reception, and the common DCI comprises a BWP indicator, a frequency-domain resource allocation, a time-domain resource allocation, or some combination thereof, and values corresponding to the common DCI are the same for the uplink transmission and downlink reception.

In one embodiment, an apparatus comprises a communication device. The communication device comprises: a transceiver to: communicate with a network device, wherein the network device, the communication device, or both operate in a full-duplex mode; receive at least one channel state information (CSI) reference signal (CSI-RS) on at least one time resource, at least one frequency resource, or a combination thereof, wherein the at least one CSI-RS is configured with at least one CSI reporting setting; transmit at least one sounding reference signals (SRS) to the network device, wherein the at least one time resource, the at least one frequency resource, or the combination thereof are correlated with the at least one SRS transmitted to the network device; and transmit at least one CSI report to the network device based on the at least one CSI-RS, the at least one SRS, or a combination thereof.

In certain embodiments, the full duplex mode comprises: the network device concurrently transmitting a first signal over a physical downlink channel and receiving a second signal over a physical uplink channel over a first common set of time and frequency resources; the communication device concurrently transmitting a third signal over a physical uplink channel and receiving a fourth signal over a physical downlink channel over a second common set of time and frequency resources; or a combination thereof.

In some embodiments, the full-duplex mode is associated with at least one bandwidth part (BWP) configured for at least one unlicensed band.

In various embodiments, the communication device operating in the full-duplex mode is configured with a capability parameter that indicates whether the communication device supports operation in the full-duplex mode.

In one embodiment, at least one symbol of the at least one CSI-RS is received on a first at least one resource element that is disjointed from a second at least one resource element on which at least one symbol of the at least one SRS is transmitted.

In certain embodiments, at least two reference signals are used for the full-duplex mode, a first reference signal of the at least two reference signals is configured to be transmitted over a physical uplink channel over a same time and frequency resources as a second reference signal of the at least two reference signals configured to be transmitted over a physical downlink channel concurrently, and symbols transmitted across the physical uplink channel and the physical downlink channel share a similar resource configuration.

In some embodiments, the communication device is configured to receive a downlink (DL) demodulation reference signal (DMRS) corresponding to a physical downlink channel and to transmit an uplink (UL) DMRS corresponding to a physical uplink channel, and the DL DMRS and the UL DMRS share a similar DMRS configuration with a different code division multiplexing (CDM) group.

In various embodiments, the at least one CSI reporting setting triggers a codebook configuration that: supports a Type-I codebook; supports a Type-II port selection codebook; comprises two codebook subset restriction (CBSR) configurations, wherein one CBSR configuration of the two CBSR configurations is associated with the full-duplex mode; or some combination thereof.

In one embodiment, the communication device is configured with downlink control information (DCI) that schedules an uplink transmission corresponding to a physical uplink channel, DCI that schedules a downlink reception corresponding to a physical downlink channel, or a combination thereof, wherein: at least one time resource, at least one frequency resource, or a combination thereof used for the physical uplink channel and the physical downlink channel is indicated by a BWP indicator, a frequency-domain resource allocation, a time-domain resource allocation, or some combination thereof; the at least one time resource, the at least one frequency resource, or the combination thereof used for the physical uplink channel and the physical downlink channel fully overlap one another; the at least one time resource, the at least one frequency resource, or the combination thereof used for the physical uplink channel and the physical downlink channel partially overlap one another; or some combination thereof.

In certain embodiments, a first field in the DCI that schedules the downlink reception indicates that a concurrent communication scheduled by a second field in the DCI that schedules the uplink transmission is expected.

In some embodiments, a CBSR configuration associated with a codebook configuration is indicated in a DCI field that is associated with the full-duplex mode.

In various embodiments, the CBSR is indicated in a bitmap format having one bit associated with at least one beam.

In one embodiment, a common DCI concurrently schedules uplink transmission and downlink reception, and the common DCI comprises a BWP indicator, a frequency-domain resource allocation, a time-domain resource allocation, or some combination thereof, and values corresponding to the common DCI are the same for the uplink transmission and downlink reception.

In one embodiment, a method in a communication device comprises: communicating with a network device, wherein the network device, the communication device, or both operate in a full-duplex mode; receiving at least one channel state information (CSI) reference signal (CSI-RS) on at least one time resource, at least one frequency resource, or a combination thereof, wherein the at least one CSI-RS is configured with at least one CSI reporting setting; transmitting at least one sounding reference signals (SRS) to the network device, wherein the at least one time resource, the at least one frequency resource, or the combination thereof are correlated with the at least one SRS transmitted to the network device; and transmitting at least one CSI report to the network device based on the at least one CSI-RS, the at least one SRS, or a combination thereof.

In certain embodiments, the full duplex mode comprises: the network device concurrently transmitting a first signal over a physical downlink channel and receiving a second signal over a physical uplink channel over a first common set of time and frequency resources; the communication device concurrently transmitting a third signal over a physical uplink channel and receiving a fourth signal over a physical downlink channel over a second common set of time and frequency resources; or a combination thereof.

In some embodiments, the full-duplex mode is associated with at least one bandwidth part (BWP) configured for at least one unlicensed band.

In various embodiments, the communication device operating in the full-duplex mode is configured with a capability parameter that indicates whether the communication device supports operation in the full-duplex mode.

In one embodiment, at least one symbol of the at least one CSI-RS is received on a first at least one resource element that is disjointed from a second at least one resource element on which at least one symbol of the at least one SRS is transmitted.

In certain embodiments, at least two reference signals are used for the full-duplex mode, a first reference signal of the at least two reference signals is configured to be transmitted over a physical uplink channel over a same time and frequency resources as a second reference signal of the at least two reference signals configured to be transmitted over a physical downlink channel concurrently, and symbols transmitted across the physical uplink channel and the physical downlink channel share a similar resource configuration.

In some embodiments, the communication device is configured to receive a downlink (DL) demodulation reference signal (DMRS) corresponding to a physical downlink channel and to transmit an uplink (UL) DMRS corresponding to a physical uplink channel, and the DL DMRS and the UL DMRS share a similar DMRS configuration with a different code division multiplexing (CDM) group.

In various embodiments, the at least one CSI reporting setting triggers a codebook configuration that: supports a Type-I codebook; supports a Type-II port selection codebook; comprises two codebook subset restriction (CBSR) configurations, wherein one CBSR configuration of the two CBSR configurations is associated with the full-duplex mode; or some combination thereof.

In one embodiment, the communication device is configured with downlink control information (DCI) that schedules an uplink transmission corresponding to a physical uplink channel, DCI that schedules a downlink reception corresponding to a physical downlink channel, or a combination thereof, wherein: at least one time resource, at least one frequency resource, or a combination thereof used for the physical uplink channel and the physical downlink channel is indicated by a BWP indicator, a frequency-domain resource allocation, a time-domain resource allocation, or some combination thereof; the at least one time resource, the at least one frequency resource, or the combination thereof used for the physical uplink channel and the physical downlink channel fully overlap one another; the at least one time resource, the at least one frequency resource, or the combination thereof used for the physical uplink channel and the physical downlink channel partially overlap one another; or some combination thereof.

In certain embodiments, a first field in the DCI that schedules the downlink reception indicates that a concurrent communication scheduled by a second field in the DCI that schedules the uplink transmission is expected.

In some embodiments, a CBSR configuration associated with a codebook configuration is indicated in a DCI field that is associated with the full-duplex mode.

In various embodiments, the CBSR is indicated in a bitmap format having one bit associated with at least one beam.

In one embodiment, a common DCI concurrently schedules uplink transmission and downlink reception, and the common DCI comprises a BWP indicator, a frequency-domain resource allocation, a time-domain resource allocation, or some combination thereof, and values corresponding to the common DCI are the same for the uplink transmission and downlink reception.

In one embodiment, an apparatus comprises a network device. The network device further comprises: a transceiver to: communicate with a communication device, wherein the network device, the communication device, or both operate in a full-duplex mode; transmit at least one channel state information (CSI) reference signals (CSI-RS) on at least one time resource, at least one frequency resource, or a combination thereof, wherein the at least one CSI-RS is configured with at least one CSI reporting setting; receive at least one sounding reference signals (SRS) from the communication device, wherein the at least one time resource, the at least one frequency resource, or the combination thereof are correlated with the at least one SRS transmitted to the network device; and receive at least one CSI report from the communication device based on the at least one CSI-RS, the at least one SRS, or a combination thereof.

In certain embodiments, the full duplex mode comprises: the network device concurrently transmitting a first signal over a physical downlink channel and receiving a second signal over a physical uplink channel over a first common set of time and frequency resources; the communication device concurrently transmitting a third signal over a physical uplink channel and receiving a fourth signal over a physical downlink channel over a second common set of time and frequency resources; or a combination thereof.

In some embodiments, the full-duplex mode is associated with at least one bandwidth part (BWP) configured for at least one unlicensed band.

In various embodiments, the communication device operating in the full-duplex mode is configured with a capability parameter that indicates whether the communication device supports operation in the full-duplex mode.

In one embodiment, at least one symbol of the at least one CSI-RS is received on a first at least one resource element that is disjointed from a second at least one resource element on which at least one symbol of the at least one SRS is transmitted.

In certain embodiments, at least two reference signals are used for the full-duplex mode, a first reference signal of the at least two reference signals is configured to be transmitted over a physical uplink channel over a same time and frequency resources as a second reference signal of the at least two reference signals configured to be transmitted over a physical downlink channel concurrently, and symbols transmitted across the physical uplink channel and the physical downlink channel share a similar resource configuration.

In some embodiments, the communication device is configured to receive a downlink (DL) demodulation reference signal (DMRS) corresponding to a physical downlink channel and to transmit an uplink (UL) DMRS corresponding to a physical uplink channel, and the DL DMRS and the UL DMRS share a similar DMRS configuration with a different code division multiplexing (CDM) group.

In various embodiments, the at least one CSI reporting setting triggers a codebook configuration that: supports a Type-I codebook; supports a Type-II port selection codebook; comprises two codebook subset restriction (CBSR) configurations, wherein one CBSR configuration of the two CBSR configurations is associated with the full-duplex mode; or some combination thereof.

In one embodiment, the communication device is configured with downlink control information (DCI) that schedules an uplink transmission corresponding to a physical uplink channel, DCI that schedules a downlink reception corresponding to a physical downlink channel, or a combination thereof, wherein: at least one time resource, at least one frequency resource, or a combination thereof used for the physical uplink channel and the physical downlink channel is indicated by a BWP indicator, a frequency-domain resource allocation, a time-domain resource allocation, or some combination thereof; the at least one time resource, the at least one frequency resource, or the combination thereof used for the physical uplink channel and the physical downlink channel fully overlap one another; the at least one time resource, the at least one frequency resource, or the combination thereof used for the physical uplink channel and the physical downlink channel partially overlap one another; or some combination thereof.

In certain embodiments, a first field in the DCI that schedules the downlink reception indicates that a concurrent communication scheduled by a second field in the DCI that schedules the uplink transmission is expected.

In some embodiments, a CBSR configuration associated with a codebook configuration is indicated in a DCI field that is associated with the full-duplex mode.

In various embodiments, the CBSR is indicated in a bitmap format having one bit associated with at least one beam.

In one embodiment, a common DCI concurrently schedules uplink transmission and downlink reception, and the common DCI comprises a BWP indicator, a frequency-domain resource allocation, a time-domain resource allocation, or some combination thereof, and values corresponding to the common DCI are the same for the uplink transmission and downlink reception.

In one embodiment, a method in a network device comprises: communicating with a communication device, wherein the network device, the communication device, or both operate in a full-duplex mode; transmitting at least one channel state information (CSI) reference signals (CSI-RS) on at least one time resource, at least one frequency resource, or a combination thereof, wherein the at least one CSI-RS is configured with at least one CSI reporting setting; receiving at least one sounding reference signals (SRS) from the communication device, wherein the at least one time resource, the at least one frequency resource, or the combination thereof are correlated with the at least one SRS transmitted to the network device; and receiving at least one CSI report from the communication device based on the at least one CSI-RS, the at least one SRS, or a combination thereof.

In certain embodiments, the full duplex mode comprises: the network device concurrently transmitting a first signal over a physical downlink channel and receiving a second signal over a physical uplink channel over a first common set of time and frequency resources; the communication device concurrently transmitting a third signal over a physical uplink channel and receiving a fourth signal over a physical downlink channel over a second common set of time and frequency resources; or a combination thereof.

In some embodiments, the full-duplex mode is associated with at least one bandwidth part (BWP) configured for at least one unlicensed band.

In various embodiments, the communication device operating in the full-duplex mode is configured with a capability parameter that indicates whether the communication device supports operation in the full-duplex mode.

In one embodiment, at least one symbol of the at least one CSI-RS is received on a first at least one resource element that is disjointed from a second at least one resource element on which at least one symbol of the at least one SRS is transmitted.

In certain embodiments, at least two reference signals are used for the full-duplex mode, a first reference signal of the at least two reference signals is configured to be transmitted over a physical uplink channel over a same time and frequency resources as a second reference signal of the at least two reference signals configured to be transmitted over a physical downlink channel concurrently, and symbols transmitted across the physical uplink channel and the physical downlink channel share a similar resource configuration.

In some embodiments, the communication device is configured to receive a downlink (DL) demodulation reference signal (DMRS) corresponding to a physical downlink channel and to transmit an uplink (UL) DMRS corresponding to a physical uplink channel, and the DL DMRS and the UL DMRS share a similar DMRS configuration with a different code division multiplexing (CDM) group.

In various embodiments, the at least one CSI reporting setting triggers a codebook configuration that: supports a Type-I codebook; supports a Type-II port selection codebook; comprises two codebook subset restriction (CBSR) configurations, wherein one CBSR configuration of the two CBSR configurations is associated with the full-duplex mode; or some combination thereof.

In one embodiment, the communication device is configured with downlink control information (DCI) that schedules an uplink transmission corresponding to a physical uplink channel, DCI that schedules a downlink reception corresponding to a physical downlink channel, or a combination thereof, wherein: at least one time resource, at least one frequency resource, or a combination thereof used for the physical uplink channel and the physical downlink channel is indicated by a BWP indicator, a frequency-domain resource allocation, a time-domain resource allocation, or some combination thereof; the at least one time resource, the at least one frequency resource, or the combination thereof used for the physical uplink channel and the physical downlink channel fully overlap one another; the at least one time resource, the at least one frequency resource, or the combination thereof used for the physical uplink channel and the physical downlink channel partially overlap one another; or some combination thereof.

In certain embodiments, a first field in the DCI that schedules the downlink reception indicates that a concurrent communication scheduled by a second field in the DCI that schedules the uplink transmission is expected.

In some embodiments, a CB SR configuration associated with a codebook configuration is indicated in a DCI field that is associated with the full-duplex mode.

In various embodiments, the CBSR is indicated in a bitmap format having one bit associated with at least one beam.

In one embodiment, a common DCI concurrently schedules uplink transmission and downlink reception, and the common DCI comprises a BWP indicator, a frequency-domain resource allocation, a time-domain resource allocation, or some combination thereof, and values corresponding to the common DCI are the same for the uplink transmission and downlink reception.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment (UE), comprising:
   at least one memory; and
   at least one processor coupled with the at least one memory and configured to cause the UE to:
   receive a downlink reference signal (RS) on one or both of time resource or a frequency resource while operating in a full-duplex mode, the received downlink RS corresponding to a channel state information (CSI) reporting setting;
   transmit an uplink RS while operating in the full-duplex mode, wherein one or both of a time resource or a frequency resource at which the uplink RS is transmitted are mapped with one or both of the time resource or the frequency resource at which the downlink RS is received; and
   transmit a CSI report based on one or both of the received downlink RS or the transmitted uplink RS, wherein a codebook subset restriction (CBSR) configuration associated with a codebook configuration is indicated in a DCI field that is associated with the full-duplex mode.

2. The UE of claim 1, wherein the at least one processor is configured to cause the UE to:

concurrently transmit a first signal over a physical uplink channel and receiving a second signal over a physical downlink channel using a common set of time and frequency resources.

3. The UE of claim 2, wherein the full-duplex mode is associated with a bandwidth part (BWP) configured for an unlicensed band.

4. The UE of claim 1, wherein the at least one processor is configured to cause the UE to:

operate in the full-duplex mode based on a capability of the UE; and transmit a message including a capability parameter indicating the capability of the UE to operate in the full-duplex mode.

5. The UE of claim 1, wherein the downlink RS corresponds to a CSI-RS and the uplink RS corresponds to a Sounding RS (SRS), and wherein at least one of the time resource or the frequency resource at which at least one symbol of the SRS is transmitted is mapped to at least one of a disjoint time resource or a disjoint frequency resource at which at least one symbol of the CSI-RS is received.

6. The UE of claim 1, wherein both the time resource and the frequency resource at which at least one symbol of the uplink RS is transmitted are mapped to a same time resource and a same frequency resource at which at least one symbol of the downlink RS is received, and both the uplink RS and the downlink RS share a similar resource configuration.

7. The UE of claim 1, wherein the downlink RS corresponds to a downlink demodulation reference signal (DMRS) corresponding to a physical downlink channel, and the uplink RS corresponds to an uplink DMRS corresponding to a physical uplink channel, and symbols of the downlink DMRS are mapped to a similar DMRS configuration as symbols of the uplink RS with a different code division multiplexing (CDM) group.

8. The UE of claim 1, wherein the CSI reporting setting triggers a codebook configuration that:

supports a Type-I codebook;

supports a Type-II port selection codebook;

comprises two CBSR configurations, wherein one CBSR configuration of the two CBSR configurations is associated with the full-duplex mode;

or a combination thereof.

9. The UE of claim 1, wherein the UE is configured with downlink control information (DCI) that schedules an uplink transmission corresponding to a physical uplink channel, DCI that schedules a downlink reception corresponding to a physical downlink channel, or a combination thereof, wherein:

at least one time resource, at least one frequency resource, or a combination thereof used for the physical uplink channel and the physical downlink channel is indicated by a BWP indicator, a frequency-domain resource allocation, a time-domain resource allocation, or a combination thereof;

the at least one time resource, the at least one frequency resource, or the combination thereof used for the physical uplink channel and the physical downlink channel fully overlap one another;

the at least one time resource, the at least one frequency resource, or the combination thereof used for the physical uplink channel and the physical downlink channel partially overlap one another;

or a combination thereof.

10. The UE of claim 9, wherein a first field in the DCI that schedules the downlink reception indicates that a concurrent communication scheduled by a second field in the DCI that schedules the uplink transmission is expected.

11. The UE of claim 1, wherein the CBSR is indicated in a bitmap format having one bit associated with at least one beam.

12. The UE of claim 1, wherein a common DCI concurrently schedules uplink transmission and downlink reception, and the common DCI comprises a BWP indicator, a frequency-domain resource allocation, a time-domain resource allocation, or a combination thereof, and values corresponding to the common DCI are the same for the uplink transmission and downlink reception.

13. A method performed by a user equipment (UE), the method comprising:

receiving a downlink reference signal (RS) on one or both of time resource or a frequency resource while operating in a full-duplex mode, the received downlink RS corresponding to a channel state information (CSI) CSI reporting setting;

transmitting an uplink RS while operating in the full-duplex mode, wherein one or both of a time resource or a frequency resource at which the uplink RS is transmitted are mapped with one or both of the time resource or the frequency resource at which the downlink RS is received; and transmitting a CSI report based on one or both of the received downlink RS or the transmitted uplink RS, wherein a codebook subset restriction (CBSR) configuration associated with a codebook configuration is indicated in a DCI field that is associated with the full-duplex mode.

14. A base station, comprising:

at least one memory; and at least one processor coupled with the at least one memory and configured to cause the base station to:

transmit a downlink reference signal (RS) on one or both of time resource or a frequency resource while operating in a full-duplex mode, the transmitted downlink RS corresponding to a channel state information (CSI) reporting setting;

receive an uplink RS while operating in the full-duplex mode, wherein one or both of a time resource or a frequency resource at which the uplink RS is received are mapped with one or both of the time resource or the frequency resource at which the downlink RS is transmitted; and receive a CSI report based on one or both of the transmitted downlink RS or the received uplink RS, wherein a codebook subset restriction (CBSR) configuration associated with a codebook configuration is indicated in a DCI field that is associated with the full-duplex mode.

15. A processor for wireless communication, comprising:

at least one controller coupled with at least one memory and configured to cause the processor to:

receive a downlink reference signal (RS) on one or both of time resource or a frequency resource while operating in a full-duplex mode, the received downlink RS corresponding to a channel state information (CSI) CSI reporting setting;

transmit an uplink RS while operating in the full-duplex mode, wherein one or both of a time resource or a frequency resource at which the uplink RS is transmitted are mapped with one or both of the time resource or the frequency resource at which the downlink RS is received; and transmit a CSI report based on one or both of the received downlink RS or the transmitted uplink RS, wherein a codebook subset restriction (CBSR) configuration associated with a codebook configuration is indicated in a DCI field that is associated with the full-duplex mode.

16. The processor of claim 15, wherein the at least one controller is configured to cause the processor to:

concurrently transmit a first signal over a physical uplink channel and receiving a second signal over a physical downlink channel using a common set of time and frequency resources.

17. The processor of claim 16, wherein the full-duplex mode is associated with a bandwidth part (BWP) configured for an unlicensed band.

18. The processor of claim 15, wherein the at least one controller is configured to cause the processor to:

operate in the full-duplex mode based on a capability of the processor; and transmit a message including a capability parameter indicating the capability of the processor to operate in the full-duplex mode.

19. The processor of claim 15, wherein the downlink RS corresponds to a CSI-RS and the uplink RS corresponds to a Sounding RS (SRS), and wherein at least one of the time resource or the frequency resource at which at least one symbol of the SRS is transmitted is mapped to at least one of a disjoint time resource or a disjoint frequency resource at which at least one symbol of the CSI-RS is received.

\* \* \* \* \*